United States Patent [19]

Rubin

[11] Patent Number: 4,584,630
[45] Date of Patent: Apr. 22, 1986

[54] MOUNTING SPACER FOR ELECTROLYTIC CAPACITOR

[75] Inventor: Steven A. Rubin, Sharon, Mass.

[73] Assignee: Universal Products, Inc., Brockton, Mass.

[21] Appl. No.: 695,256

[22] Filed: Jan. 28, 1985

[51] Int. Cl.⁴ .................. H01G 9/00; H02G 13/08; B65D 73/02
[52] U.S. Cl. .................. 361/433; 174/52 R; 206/334
[58] Field of Search .......... 361/433 W, 433 S, 433 H, 361/433 L; 174/52 R, 52 H, 52 PE; 206/334

[56] References Cited

U.S. PATENT DOCUMENTS

| | | |
|---|---|---|
| 1,395,281 | 11/1921 | Koretzky . |
| 1,874,111 | 8/1932 | Mershon . |
| 2,129,000 | 9/1938 | Given . |
| 2,129,089 | 9/1938 | Hood . |
| 2,139,127 | 12/1938 | Mandusky ..................... 206/334 X |
| 2,234,042 | 3/1941 | Deeley . |
| 2,236,496 | 4/1941 | Beggs . |
| 2,287,114 | 6/1942 | McEachon . |
| 2,643,327 | 6/1953 | Macklenar . |
| 2,758,259 | 8/1956 | Peck . |
| 2,962,638 | 11/1960 | Nieders .......................... 206/334 X |
| 2,963,771 | 12/1960 | Clemons ........................... 29/25.42 |
| 3,014,978 | 12/1961 | Lebert et al. ...................... 174/52 |
| 3,204,164 | 8/1965 | Burke et al. . |
| 3,243,668 | 4/1966 | Diggens . |
| 3,258,666 | 6/1966 | Dubilier . |
| 3,301,270 | 1/1967 | Horn . |
| 3,502,948 | 3/1970 | Crouch et al. . |
| 3,534,230 | 10/1970 | Krasienko et al. . |
| 3,551,756 | 12/1970 | Frekko . |
| 4,342,070 | 7/1982 | Evans ................................ 361/433 |
| 4,459,641 | 7/1984 | Giacomelio ...................... 361/433 |

Primary Examiner—Donald A. Griffin
Attorney, Agent, or Firm—Steven J. Henry

[57] ABSTRACT

A mounting spacer (16) for use in an electrolytic capacitor (10) having a capacitance section (14) and a tubular casing (12), which locates and restrains the capacitance section within the casing. The mounting spacer (16) is a flexible plastic sheet which when folded fits inside and bears against the tubular casing (12). The spacer has a base section (34) with at least two living hinges (30, 32); the living hinges connect the base section to wedge sections (40, 42) and support arms (36, 38). The support arms have cutout sections (44, 46) formed by the pivoting of wedge sections (40, 42) which receive and longitudinally support the capacitance section during assembly of the capacitor. The support arms flex after insertion to partially wrap around and laterally support the capacitance section while maintaining contact with the casing. After assembly, the wedge sections are resiliently held in contact with the tubular casing by the resilient base section (34) to center the spacer. The wedge sections thereby center and provide end support for the capacitance section held in the support arms.

10 Claims, 3 Drawing Figures

U.S. Patent
Apr. 22, 1986
4,584,630
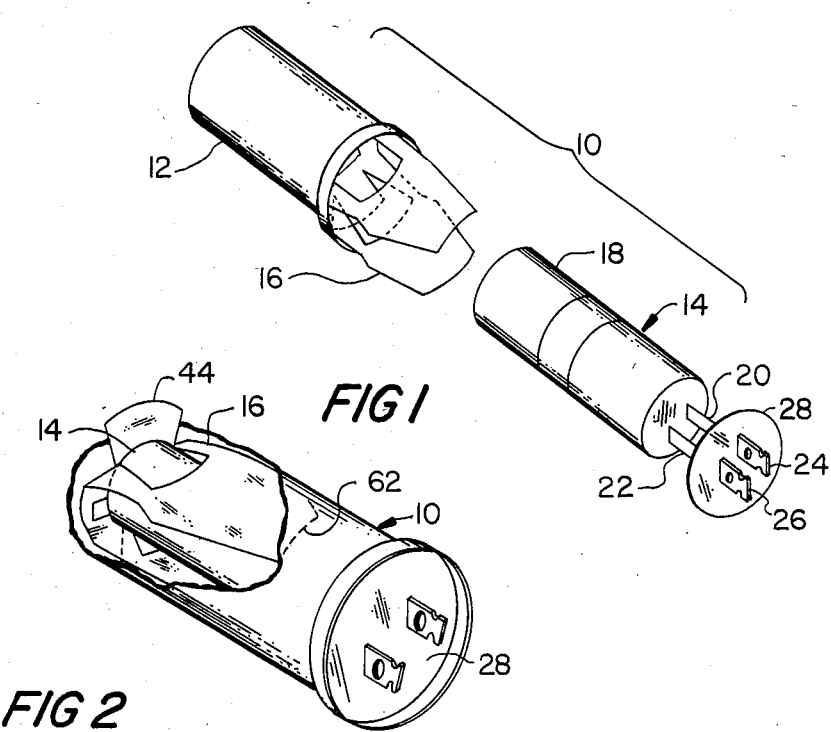
FIG 1
FIG 2
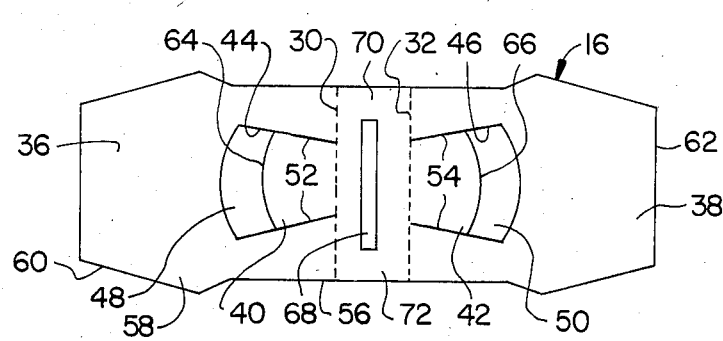
FIG 3

MOUNTING SPACER FOR ELECTROLYTIC CAPACITOR

FIELD OF THE INVENTION

This invention relates to a component mounting spacer for electrolytic capacitors that prevents movement and vibration of active capacitance sections within capacitor casings. It is particularly suited to automated assembly of capacitors.

BACKGROUND OF THE INVENTION

Typically, electrolytic capacitors have one or more active capacitance sections mounted in a metallic casing. Generally at least a portion of the space between the capacitor casing and the capacitance section(s) is filled with a potting compound in order to insulate and seperate the active capacitance section(s) from the casing and prevent vibratory movement of the capacitance section(s). Vibratory movement can cause mechanical failure of electrical connections internal to the capacitor and can damage insulation. The potting compounds typically used to prevent this vibration are a type of wax or pitch which can withstand some variation in capacitor operating temperature.

Several disadvantages have been found in this type of mounting. While potting compounds are generally satisfactory for capacitors used at moderate operating temperatures, they are unsatisfactory at high temperatures such as found in high voltage equipment and at low temperatures such as found in aircraft or spacecraft avionics. At high temperatures, potting compounds can melt and become dangerous fire hazards, since most potting compounds are highly inflammable. Further, interaction between the capacitor's electrolyte and the potting compound can cause deterioration of the capacitance sections and/or the potting compound over a period of time, which, in turn, can cause capacitor failure. At low temperatures, potting compounds can become brittle and ineffectual in restraining the capacitance sections. It should also be noted that potting compounds are messy to use and that if a capacitor casing is improperly filled the capacitor may operate poorly. Further, fumes from capacitor potting compounds can be hazardous to workers.

As a result of these disadvantages, alternate methods have been proposed for securing capacitance sections within a casing. In all of these methods, it is necessary to provide some kind of an arrangement which accomodates thermal expansion of the capacitance sections. Thus, it is not possible, for example, to provide a casing which tightly grips a capacitance section. As a result, various spacing and mounting devices have been proposed for insertion into the capacitor casing along with a capacitance section. Most of these proposed devices however, have not been widely adopted since they either greatly increase the cost of capacitor manufacture or are not wholly satisfactory in protecting capacitance sections from physical shocks and vibrations.

One example of such a device is disclosed in U.S. Pat. No. 2,758,259 to Peck, in which is described a supporting means for an electrolytic capacitance section. This supporting means comprises a preformed multilegged spacer with a central prong configured as a tapered cone to support the capacitance section. While this device is an alternative to the conventional potting techniques, the multilegged spacer is believed to be a relatively expensive device to manufacture; further since it only makes contact with the capacitance section at one location, it cannot fully support the capacitance section to effectively prevent vibration and other shock damage.

Another example of a spacing device for an electrolytic capacitor is shown in U.S. Pat. No. 4,459,641 to Giacomelo. In the Giacomelo device, a wrap-around support is positioned between a capacitance section and its casing. Although this device provides lateral (or radial) support for the capacitance section, use of the device adds an assembly step during the manufacture of the capacitor; that is, the support must be rolled around the capacitance section prior to its insertion into the casing. Further, it does not provide any longitudinal support for the end of the capacitance section.

It is an object of the present invention therefore, to provide an improved mounting spacer for capacitance sections in electrolytic capacitors.

It is also an object of this invention that this improved mounting spacer be able to protect the capacitance section from vibration and impact damage.

It is a further object of this invention to provide a mounting spacer which will be able to withstand extreme temperatures without losing its beneficial properties.

It is still another object of this invention to provide a mounting spacer for a capacitance section which is particularly suited for inexpensive manufacture and automatic insertion into a capacitor casing.

SUMMARY OF THE INVENTION

The invention comprises a mounting spacer for use in a capacitor having a rolled capacitance section and a tubular casing, to locate and restrain the capacitance section within the casing. The mounting spacer comprises a specially formed flexible plastic sheet which when folded fits inside and bears against both the tubular casing and the capacitance section. The spacer has a base section with at least two opposed living hinges; each living hinge connects the base section to a wedge section and a support arm. The support arms have cutout portions, part of the material from which forms the wedge sections. The cutout portions recieve and longitudinally support the capacitance section during assembly of the capacitor. The support arms flex during insertion to partially wrap around and laterally (i.e., radially) support the capacitance section, while maintaining contact with the casing and spacing the capacitance section therefrom. The support arms also have tapered sides which, with the cutout sections, facilitate flexing of the arms so that they adjust to the curvature of the tubular casing when inserted therein. Each wedge section has a curved end portion distal the associated living hinge, the contour of the end portions substantially matching the curvature of the casing. After insertion, the wedge sections are resiliently held in contact with the tubular casing adjacent at its closed end by the resilient base section of the mounting spacer. The base section of the spacer is generally rectangular in shape and is slotted with a rectangular hole to increase its flexibility so that it provides a biasing force to maintain the wedge sections in contact with the tubular casing. The wedge sections thereby center and provide end support and lateral restraint for the capacitance section.

BRIEF DESCRIPTION OF THE DRAWING

The foregoing and other objects, features, and advantages of the invention will be apparent from the following more particular description of the preferred embodiments of the invention, as illustrated in the accompaning drawing in which like reference characters refer to the same parts throughout the different views. The drawing is not necessarily to scale, emphasis instead being placed upon illustrating the principles of the invention.

FIG. 1 is an exploded perspective view of an electrolytic capacitor including a mounting device embodying the principles of this invention.

FIG. 2 is a perspective view of the assembled capacitor of FIG. 1, with the capacitor casing partially broken away.

FIG. 3 is a plan view of a capacitor spacer embodying the principles of this invention.

DETAILED DESCRIPTION OF AN ILLUSTRATIVE EMBODIMENT

FIG. 1 shows an electrolytic capacitor 10 made up of a metal casing 12 and an active capacitance section 14. The casing is shown with a partially inserted mounting spacer 16 for use in restraining the capacitance section.

The capacitance section 14 as shown in FIG. 1 is of conventional design and is formed of a roll 18 of alternative layers of metallic foils and dielectric paper. This invention however, could easily be applied to other types of capacitors having different construction. Electrical leads 20 and 22 connect the electrodes (not shown) of the capacitance roll 18 to terminals 24 and 26 which extend through a capacitor cover 28 to make available external points of connection. The cover 28 is of the type which can be sealed by rolling the edge of the casing 12 over the edge of the cover 28.

The electrical leads and their points of connection to the terminals and electrodes are subjected to flexing and stress from vibration and thermal motion of the capacitance section. If capacitance section vibration is not controlled, the electrical connections within the capacitor will eventually fail.

FIG. 2 shows the mounting spacer 16 as it is positioned after it is completely assembled into the casing with capacitance section 14.

FIG. 3 shows the mounting spacer in its flat sheet condition as manufactured, prior to capacitor assembly.

The mounting spacer 16 is made of a resilient material such as homopolymer polypropylene but other materials with similar properties can also be used. This material can withstand both extreme heat and cold without becoming brittle and still be able to resiliently support the capacitance section 14. Homopolymer polypropylene is also an excellent insulator for the capacitance section.

When the mounting spacer 16 is inserted into the casing 12 with the capacitance section 14, to assemble the capacitor, linear indents 30 and 32 at each side of a base section 34 form living hinges for a pair of support arms 36, 38 and a pair of wedge sections 40, 42.

The support arms have cutout portions 44,46 formed by the pivoting of the wedge sections 40, 42 and the removal of a small piece of the sheet material (from areas 48,50) which is discarded during manufacture. When the capcitor is assembled a portion of the capacitance section is inserted into the cutout portions. The cutout portions have tapered sides 52,54 which slope closer to each other nearest the base section 34 of the spacer; as a result, the cutout portions 44,46 support the capacitance section and prevent it from touching the closed end of the casing. The edges of the arms 36 and 38 are formed with a parallel sided portion 56, a flared portion 58 and a tapered portion 60 to facilitate, with the cutout sections, the partial wrapping of the arms around the capacitance roll 18 during insertion into the casing 12. The cutout portions thereby form alignment holes which receive and laterally restrain the capacitance section.

When the arms are wrapped around the capacitance section as shown in FIG. 2, they make contact with the inner walls of the casing 12 to provide two stand-off stabilizing supports. The wrapping of the arms 30 and 32 around the capacitor section 18 forces the arms and particularly the arms' top edges 62 into a curved condition that roughly matches the curvature of casing 12 with which it makes contact. The arms' edges 60 are tapered so that they firmly contact the casing wall to help form a stabilizingly long support span for the support arms.

After insertion of the mounting spacer 16 into the casing, wedge sections 40 and 42 form, in conjunction with base section 34, a resilient support for centering the spacer and thus the capacitance section 14. Curved sections 64, 66 of the wedges 40, 42 approximately match the curvature of the casing 12, however the distance between the curved sections is greater then the diameter of the casing 12. As a result the wedge sections are pushed inward, towards each other, when they are inserted into the casing. The base section 34 thus provides a biasing force to hold the wedges 40 and 42 against the inner wall of the casing 12, automatically aligning the spacer. The resiliency of the base section 34 is controlled by the dimensions of slot 68, the width of side sections 70 and 72 and the thickness of the spacer sheet. To increase the resiliency of the base, for example, the width of the side sections or the thickness of the material could be increased.

The combination of the wedges at the casing base and the support arms further up the casing wall provides four points of contact between the casing and the spacer. A stable centered frame is thereby created to hold the capacitance section, which is firmly gripped by the support arms. This support, due to the nature of the plastic material used for the mounting spacer is of a resilient nature that cushions the capacitance section from external shock and vibration.

This mounting device thus minimizes harmful motion in the capacitor which could fatigue electrical leads and lead connections or damage the capacitance section. Further, mounting spacers made from homopolymer polypropylene are largely unaffected by variations in operating temperatures, ranging from 300° F. to −100° F. As a result this mounting device is far superior to the conventional potting compounds when used in hostile environments.

Another important advantage of the mounting spacer is that it is extremely inexpensive to manufacture and to use. Sheet plastic material is simply cut and scored to form the desired shape with the preferred living hinges. The thickness and the nature of the materials used for the mounting device determine its reliliency and may be varied for different usages and electronic components. The shape and structure of the mounting spacer, however, must be varied to use it with electronic components of different sizes and shapes but this is easily done minor experimentation.

This mounting spacer, as mentioned above, is perfectly suited for automatic insertion. As implied in the exploded view of FIG. 1, the first step in capacitor assembly with this mounting spacer is to place the spacer over the mouth of the casing. The capacitance section is then pressed against the spacer, forcing it into the casing. The spacer adopts its preferred supporting position (shown in FIG. 2) automatically as it is pressed into the casing. The mounting spacer 16 therefore automatically aligns itself with respect to the capcitance section and the casing through the operation of the curved surfaces 64, 66 on the wedges 40, 42 and the cutout sections 44,46 in the support arms 36,38. The support arms, which are shaped so that they will always bend in the prefered fashion to wrap around the capacitance section, urge the capacitance section into and hold it in the cutouts 44,46 defined by the arms. Therefore, no special techniques are required to assemble a capacitor with this mounting spacer. Further, the somewhat messy job of partially filling a capacitor casing with potting compound is completely eliminated.

While the invention has been particularly shown and described with reference to the preferred embodiment thereof, it will be understood by those in the art that various changes in form and details may be made without departing from the spirit and scope of the invention as defined by the appended claims. For example, this mounting device could be used for a variety of electronic components inserted into tubular casings and is not limited to electrolytic capacitors, since the advantages inherent in its use are unaffected by the nature of the electronic component.

What is claimed is:

1. An electrolytic capacitor comprising:
   a metallic casing having an open end;
   a capacitance section comprising electrodes and a dielectric; and
   a flexible plastic spacer comprising;
      a base section,
      at least two support arms attached to said base section by hinges, said support arms shaped to hold and laterally support said capacitance section and bear against said metallic casing, and
      at least two wedge sections joined to said base sections by said hinges such that said base portion provides a biasing force to hold said wedges in contact with said metallic casing in order to center said spacer and said capacitance section within said casing.

2. The electrolytic capacitor of claim 1 wherein said flexible plastic spacer is constructed of homopolymer polypropylene.

3. The electrolytic capacitor of claim 1 wherein said base section further comprises a slotted portion which substantially increases the flexibility of said base section.

4. The electrolytic capacitor of claim 1 wherein said support arms further include cutout portions which form alignment and support means for receiving said capacitance section.

5. The electrolytic capacitor of claim 4 wherein said support arms further comprise flared portions and tapered portions which in combination with said cutout portions facilitate partial wrapping of said support arms around said capcitance section.

6. The electrolytic capacitor of claim 5 wherein said tapered portions of said support arms contact said casing to provide structural support for said support arms.

7. A component holder for a tubular electronic device comprising a resilient plastic sheet sized to fit inside a cylindrical casing, said plastic sheet comprising:
   a base section with at least two hinges for connection thereto of at least two centering wedges, said wedges having a curved end section which substantially matches the curvature of said casing; and
   at least two support arms having cutout portions which facilitate flexing of the support arms, so that they substantially match the curvature of said cylindrical casing when inserted therein, and tapered side portions which contact said cylindrical casing to provide anti-vibrational support for said component.

8. The component holder of claim 7 wherein the component holder is made from homopolymer polypropylene.

9. An electrical capacitor comprising a tubular metallic casing having a closed end, a capacitance section comprising electrodes and dielectrics, and a flexible plastic spacer comprising:
   a base section;
   two support arms pivotably attached to said base section, said support arms having a parallel sided section, a flared section and a tapered section which facilitate wrapping of said support arms around said capcitance section while permitting said support arms to maintain contact with said tubular metallic casing in order to hold and vertically postion said capcitance section; and
   wedge sections also pivotably attached to said base section, said wedge sections provided with curved ends which substantially match the curvature of said having tubular metallic casing in order to center said flexible plastic spacer within said tubular metallic casing.

10. The electrical capacitor claimed in claim 9 wherein said flexible plastic spacer further comprises a slotted portion in said base which substantially increases the flexibility of said base so that said base provides a biasing force to said wedge sections to resiliently maintain them in contact with said tubular metallic casing.

* * * * *